UNITED STATES PATENT OFFICE.

ROBERT E. LYONS, OF BLOOMINGTON, INDIANA.

PROCESS FOR THE RECOVERY OF PRECIOUS METALS.

1,293,828.        Specification of Letters Patent.     Patented Feb. 11, 1919.

No Drawing.      Application filed March 20, 1913. Serial No. 755,681.

*To all whom it may concern:*

Be it known that I, ROBERT E. LYONS, a citizen of the United States, residing at Bloomington, in Monroe county, State of Indiana, have invented certain new and useful Improvements in Processes for the Recovery of Precious Metals, of which the following is a specification.

My invention relates broadly to a new and improved process of extracting the more negative electro-chemical elements and their alloys in their natural condition as found in gravel, clay or sand, or in crushed material or concentrates, and specifically relates to the formation of an amalgam of the valuable silver, gold and platinum metals.

The object of my invention broadly is to produce a process whereby the precious metals and particularly gold and platinum and their alloys in their natural state may be readily recovered without previous smelting or other treatment and the invention consists in the new and novel features and steps hereinafter set forth.

The process consists primarily in agitating or otherwise bringing into intimate physical and chemical contact the auriferous or platiniferous metals or alloys thereof in the presence of mercury and a metal electro-chemically more positive than mercury or an amalgam of mercury and the positive metal, together with a chemical agent capable of attacking such positive metal in the presence of the precious metals or capable of actively promoting the formation of the resulting precious metal amalgam.

The materials may be thoroughly mixed in any suitable manner as by tumbling the mixture in a suitable barrel or by streaming the material containing values, mixed with the decomposing solution, over plates coated with the amalgam of the positive metal, but it is obvious that any suitable mixed method may be used to bring the substances into intimate physical and chemical association. This mixing forms an amalgam of the precious metals from which the pure precious metals may be separated from the residue by any approved means, this step being well known and forming no part of the novelty of my invention. While theoretically the amalgam of any metal electropositive to mercury may be employed, the more positive of the metals, such as sodium or any of the light earth metals yield amalgams which have the disadvantage of being readily decomposed by water which is usually present in an operation of this character. It has been found from experiments that the best results, commercially, are obtained from the use of an amalgam of zinc or a compound amalgam of zinc and bismuth, especially as platinum has a strong adherence for zinc amalgam.

In the presence of the gold, platinum or in fact any of the negative electro-chemical metals, this positive metal amalgam is brought into contact with a substance, preferably in the form of a solution, capable of attacking the electro-chemically positive metal or metals in the amalgam, which action appears to decompose this amalgam and permit the adherence of the gold, platinum or other negative electro-chemical metal.

This decomposing substance may be either an acid which presumably forms a salt or compound with the electro-positive metal, liberating free hydrogen, or in some cases it may be a strong alkali, preferably slightly warmed, such as sodium hydroxid in which case there is a liberation of a free hydrogen. The proportion of the materials may be varied within relatively wide limits, but a one per cent. zinc amalgam and a three per cent. sulfuric or hydrochloric acid solution has been found very efficient.

The positive metal amalgam may be prepared by mixing the elements before being added to the precious metal bearing materials or they may be added separately, it being merely necessary to bring the elements together in the presence of the precious metals and the decomposing solution.

By means of this process it is possible to amalgamate the precious metals such as gold, even when covered by those substances which usually obstruct the amalgamation. These foreign coatings are usually some of the forms of sulfur, iron, arsenic, or compounds such as hydrated silicates, and their presence has heretofore rendered the extraction of such gold both difficult and expensive. The amalgam of positive metals such as zinc is not destroyed by the presence of water. Furthermore, the more positive metal in the amalgam is attacked but slightly or not at all, except in the presence of the precious metal so that the process is economical, using the least possible amount of re-agents.

The amalgam of the precious metals thus formed is very stable and the metals will not separate when the material such as sand, clay, gravel or concentrates are being tumbled, stirred, raked or mixed together, nor when the material is being passed through sluices or other riffles or tables or similar devices for the purpose of separating the gangue and waste.

Although I have described my process with reference particularly to gold and platinum, metals or alloys, it is to be understood that the process is equally applicable to silver and the rare metals electro-chemically negative to mercury.

Having thus described my invention what I claim as new and desire to protect by Letters Patent is:—

1. In the art of forming a platinum amalgam from platiniferous material associated with gangue, the process which consists in bringing the material into contact with mercury, zinc and a substance capable of attacking the zinc in the presence of the platiniferous material.

2. In the art of forming a platinum amalgam, from platiniferous material associated with gangue, the process which consists in bringing the material into contact with mercury, zinc and sulfuric acid.

This specification signed and witnessed this 17th day of March, A. D., 1913.

ROBERT E. LYONS.

Signed in the presence of—
M. P. WINNE,
MABEL J. COOPER.